Aug. 29, 1939.　　　R. W. STIRGWOLT　　　2,171,510
COOKING MACHINE
Filed Feb. 1, 1938　　　5 Sheets-Sheet 3

INVENTOR.
Robert W. Stirgwolt
BY Hull, Brock & West
ATTORNEYS.

Aug. 29, 1939.　　　R. W. STIRGWOLT　　　2,171,510
COOKING MACHINE
Filed Feb. 1, 1938　　　5 Sheets-Sheet 5
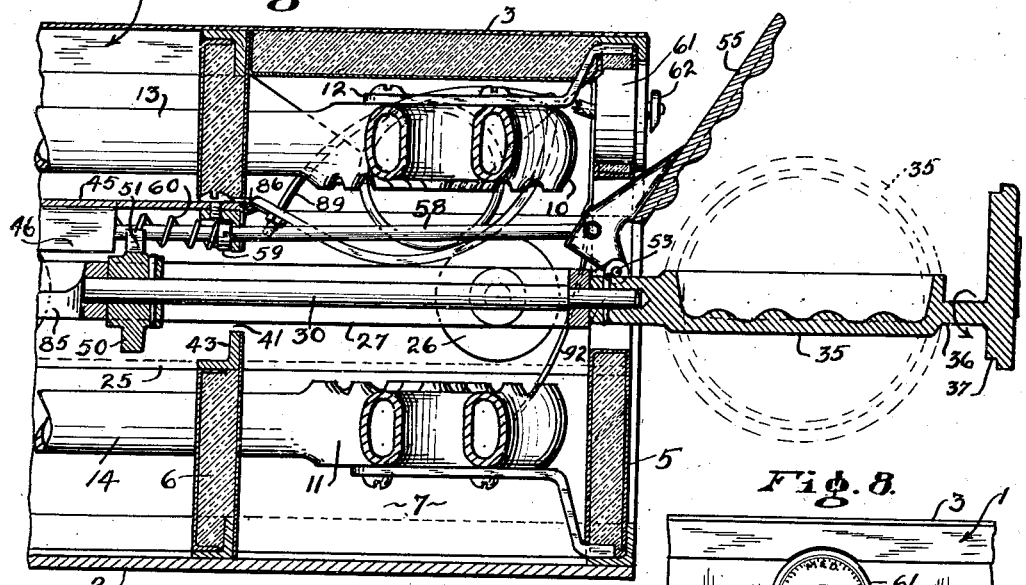
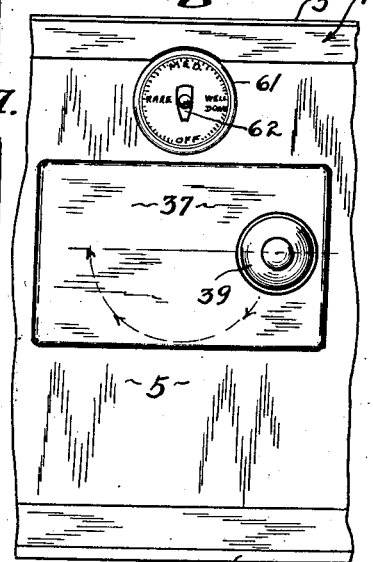
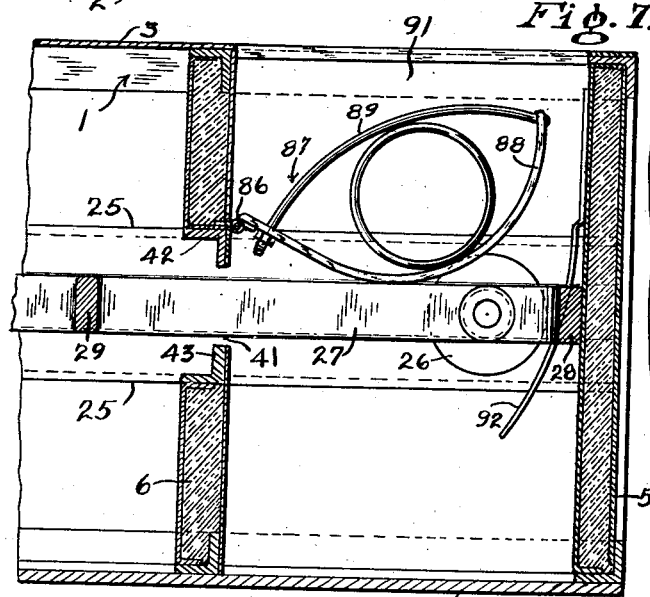
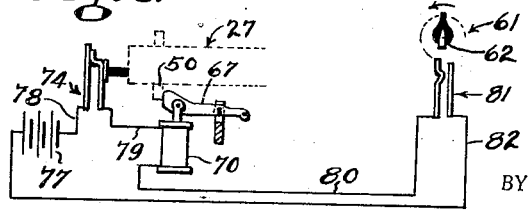
INVENTOR.
Robert W. Stirgwolt
Hull, Brock & West
BY
ATTORNEYS.

UNITED STATES PATENT OFFICE 2,171,510

COOKING MACHINE

Robert W. Stirgwolt, Bay Village, Ohio, assignor to Jak-Kraw, Inc., Rocky River, Ohio, a corporation of Ohio Application February 1, 1938, Serial No. 188,132

20 Claims. (Cl. 53—5)

This invention is an improved cooking machine, especially suitable for use in restaurants, lunch stands, hotels and similar places, where speed and proper cooking in preparing food are essential. The machine is used for grilling meat cakes or the like, and, in its preferred embodiment, for simultaneously heating or toasting pieces of bread or halves of a bun which, with the meat cake, constitute a sandwich.

An object of the invention is the production of a cooking machine by which meat cakes or the like may be grilled, and desirably simultaneously therewith the halves of a bun, or pieces of bread in other form, may be heated or toasted in the preparation of the constituents of a sandwich.

Another object is the production of a machine of the aforesaid character that is semi-automatic in that it ceases to function when the food has been cooked to the desired extent, or for a predetermined length of time, and thereafter maintains the food hot for serving within a reasonable time, thus removing the human element from this vital phase of the operation and insuring proper preparation of the food, thereby permitting the employment of operators or attendants who are inexperienced in cooking.

A more limited object is the production of a gas fired cooking machine in which the gas is turned off automatically when the cooking process is advanced to the desired stage, and wherein the food is automatically projected from the cooking compartment.

Another object of the invention is to provide a cooking machine in which a grill is horizontally disposed between and in closely spaced relation to upper and lower combustion means or gas burners thereby to obviate turning of the food and greatly expediting the cooking operation, reducing the time ordinarily required approximately one half, at the same time insuring uniform cooking of the mass.

A further object is to provide a compact and neat appearing cooking machine that may be used singly or in multiple, thus providing for expansion in production facilities as the demand increases.

A still further object is to provide a highly efficient cooking machine that is especially convenient and economical of use and is easy and simple of installation.

Figure 1:
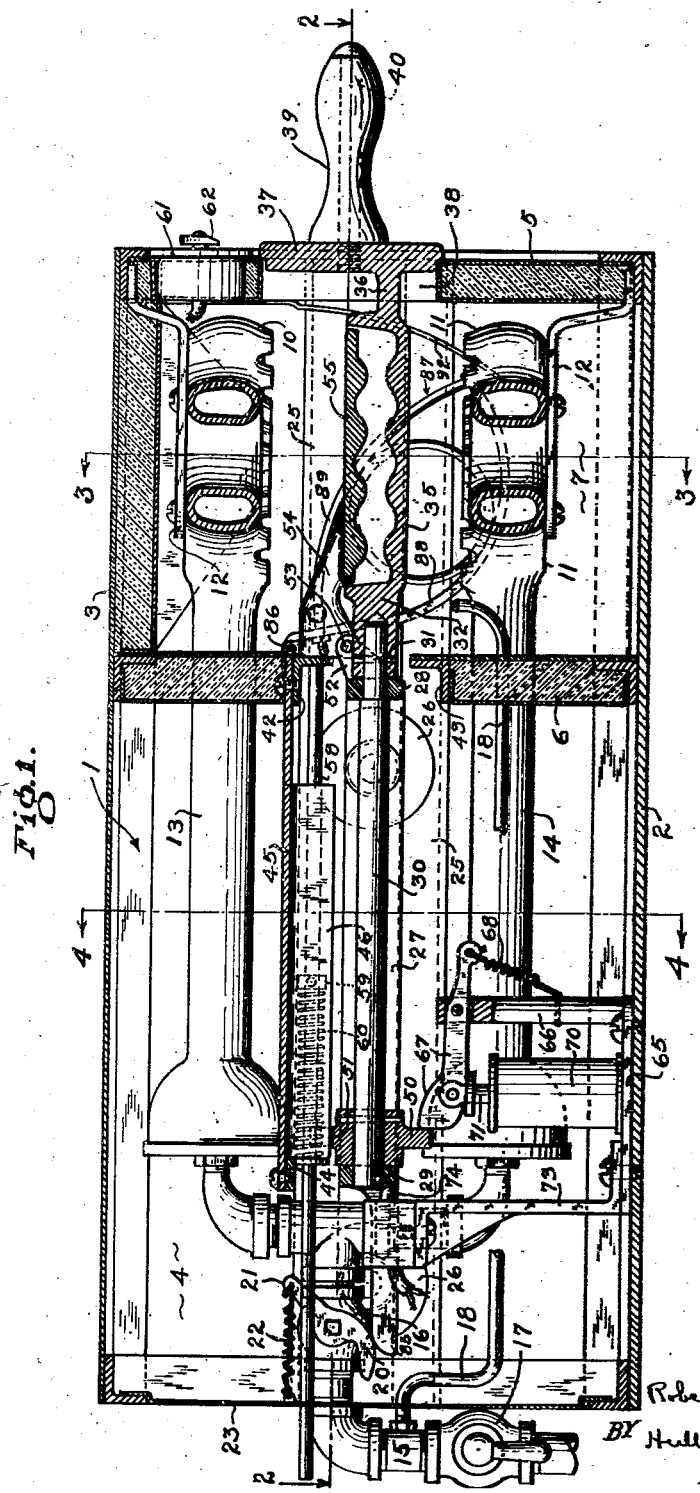
Figure 2:
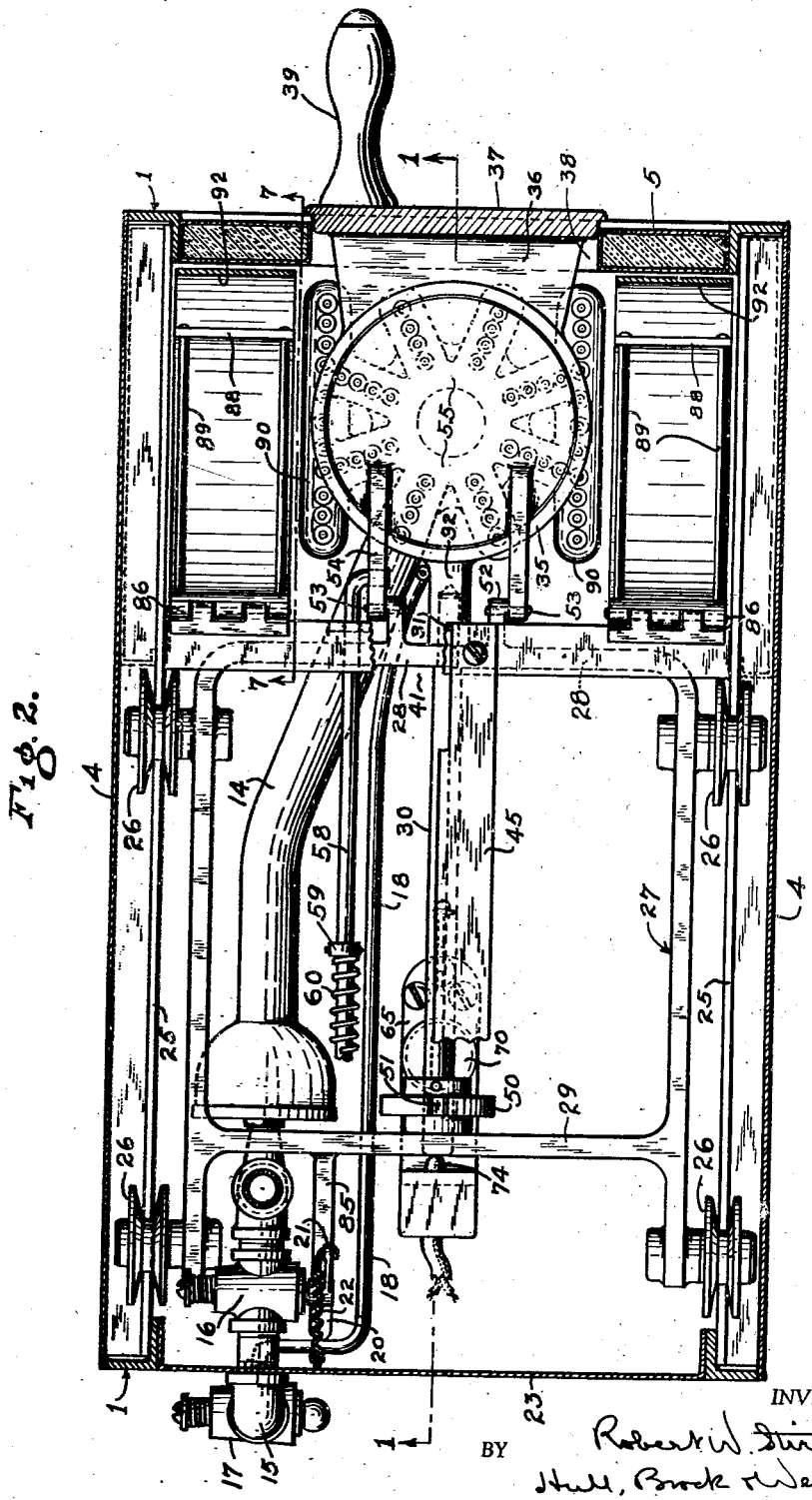
Figure 3:
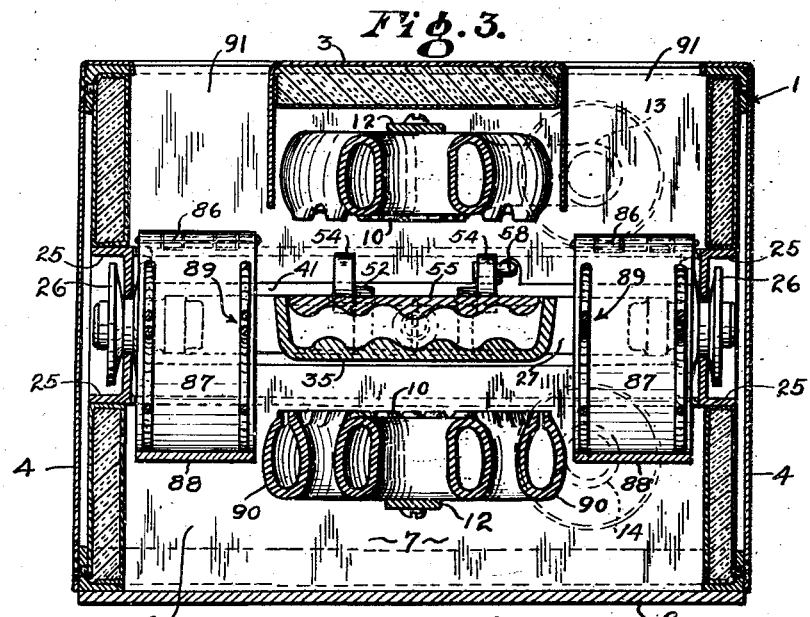
Figure 4:
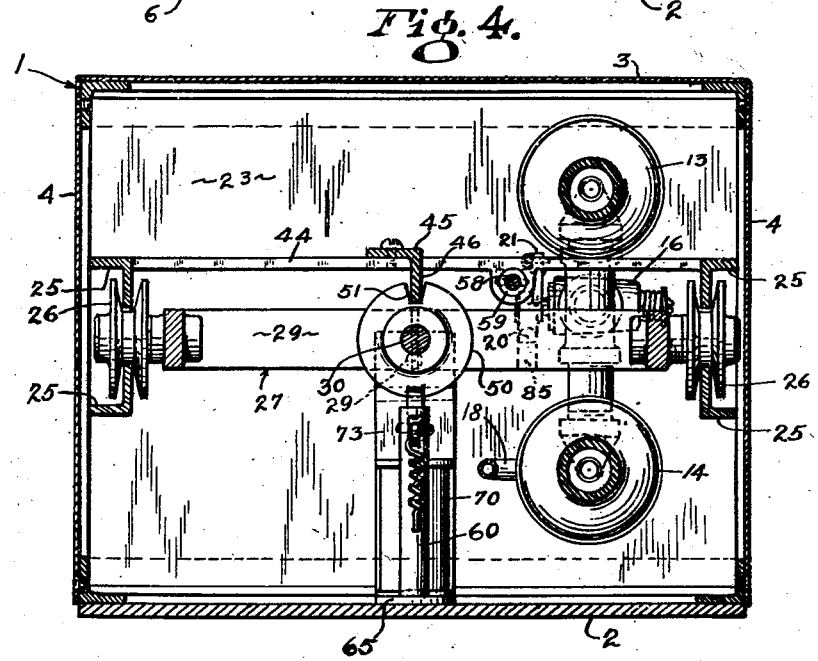
Figure 5:
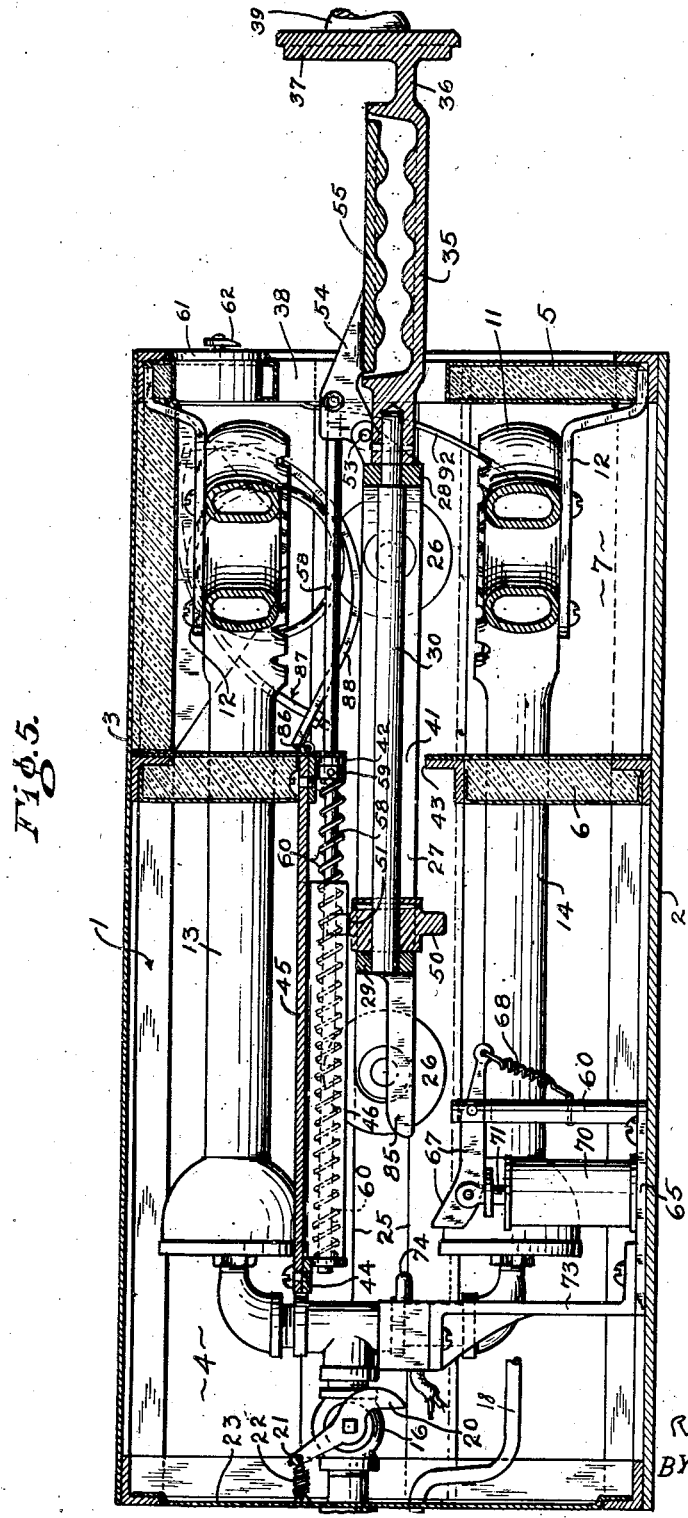

Further objects will appear as I proceed to describe the invention by reference to the accompanying drawings wherein Fig. 1 is a central vertical longitudinal section through the machine substantially on the line 1—1 of Fig. 2; Fig. 2 is a horizontal section substantially on the line 2—2 of Fig. 1; Figs. 3 and 4 are transverse sections on the respective lines 3—3 and 4—4 of Fig. 1; Fig. 5 is a view similar to Fig. 1 showing the carriage advanced to a position in which the grill cup is projected from the cooking compartment and the toast receptacles are elevated; Fig. 6 is a central vertical longitudinal section through the front part of the machine with the grill cup advanced to turning position and with the lid thereof elevated; Fig. 7 is a similar section through the front part of the machine adjacent one of the toast receptacles and showing the latter elevated, the plane of section being indicated by the line 7—7 of Fig. 2; Fig. 8 is a fragmentary front elevation of the machine, and Fig. 9 is a wiring diagram including the time switch and the electromagnetic latch for the carriage.

The frame of the machine, designated generally by the numeral 1, is rectangular and includes a base plate 2. A casing comprising a top wall 3 and side walls 4 encloses and extends from front to rear of the frame. Between an insulated front wall 5, and a similar rearwardly spaced parallel partition 6 is a cooking compartment 7, whose top and side walls are also insulated where possible, as indicated in Fig. 3.

Top and bottom gas burners, designated 10 and 11, respectively, are supported by brackets 12 from the frame of the machine, and mixing tubes 13 and 14 of the respective burners extend rearwardly through openings in the partition 6 to where their flared receiving ends have the usual connection with branches of a gas supply pipe 15, equipped with a control valve 16, and with a shutoff valve 17. A pilot light, disposed in operative relation to the burners, is provided by a tube 18 that leads from the supply pipe 15 above the shut-off valve 17. To the stem of the control valve 16 is fastened an operating member 20 to an arm 21 of which is connected one end of a spring 22 whose other end is anchored to a wall 23 that closes the back end of the frame 1 and which spring tends to close the control valve.

Incorporated in each side of the frame 1 are horizontal rails 25 that are vertically spaced from each other and between which are guided flange rollers 26 that support a carriage 27. The carriage is in the nature of an open frame having a front cross member 28 and a rear cross member 29. Extending longitudinally of the carriage at about the transverse center thereof is a shaft 30 whose rear end is journaled in a bearing aperture in the cross member 29, and whose reduced forward end is journaled in and projects beyond a bearing aperture in the cross member 28. Secured to the protruding forward end of the shaft 30, as by a pin 31, is a hollow boss 32 of a grill cup 35. The grill cup is shown as circular in plan and as having a relatively deep peripheral wall and extending forwardly from, and desirably formed integral with, the grill cup is a web 36 that carries a flanged closure 37 for an opening 38 in the front wall 5. The closure 37 is rectangular, as shown in Fig. 8, and near one end is equipped with a handle 39. The handle freely rotates on a headed stud 40 that projects from the closure 37 and may be used like the handle of a crank in the turning of the grill cup, as will hereinafter more fully appear.

The partition 6 has a transverse slot 41 for the accommodation of the carriage 27, the top and bottom edges of the slot being defined by frame members 42 and 43, respectively. Spaced a material distance rearwardly of the frame member 42, and parallel thereto and in the same horizontal plane, is a frame member 44. Supported by and between the frame members 42 and 44 is a bar 45 having a depending flange 46 that is disposed in the vertical plane of the shaft 30 and extends from a point adjacent the frame member 44 forwardly to within a short distance of the frame member 42. Pinned or otherwise secured to the shaft 30 adjacent the rear cross member 29 of the carriage is a collar 50 whose edge portion is provided with a radial notch 51 that is adapted to receive the flange 46 when the carriage 27 is in any but its extreme forward position. As a consequence, the shaft 30 is held against turning excepting when the carriage is fully advanced.

Extending forwardly and slightly upwardly from the front cross member 28 of the carriage 27, substantially equal distances on opposite sides of the longitudinal axis of the carriage, are lugs 52 to which are pivotally connected, by pins 53, the rear ends of parallel arms 54 that carry, and are preferably formed integral with, the cover 55 of the grill cup 35. When the carriage is in its rear position, as shown in Figs. 1 and 2, upper rear corners of the arms 54 engage the partition 6 above the slot 41 thereby to positively retain the cover 55 in closed position. Pivoted to one of the arms 54, above and forwardly of its pivotal axis, is the forward end of a rod 58 that is guided through an opening in the frame member 42 and has its rear end extended through an opening in a depending part of the frame member 44. An abutment 59 is secured to the rod 58 in a position to engage the frame member 42 when the carriage is advanced to the position shown in Fig. 5 with the grill cup 35 projected from the cooking compartment and with the cover 55 in closed position. As will presently appear, this is the position to which the grill cup is automatically projected at the conclusion of the cooking period and where it remains to keep the food warm until subsequently manually operated to discharge the food. The carriage is advanced to this position by a compression spring 60 that surrounds the rod 58 and is confined between the abutment 59 and the depending portion of the frame member 44.

The carriage 27 may be retained at the inner end of its movement, with the grill cup 35 in cooking position between the burners 10 and 11, by any approved type of time latch. For the purpose of illustration I have combined a time switch and electromagnetic latch for accomplishing this end. A time switch 61 (Figs. 1, 5, 6, 8 and 9), which may be of any suitable character, is shown as set within the front wall 5 above the opening 38 where it is readily accessible and easily seen. This time switch may consist of the usual spring actuated escapement mechanism (not shown) that is adapted to be set by a handle 62. The make-and-break device incorporated in the time switch is in closed condition only when the handle 62 is in "off" position, as shown in Fig. 8. When the handle is turned in a clockwise direction to set the switch according to the desired duration of the cooking period, as indicated in Fig. 9, the escapement mechanism is set into action and retards return of the mechanism to normal position. Consequently, the circuit will remain open during the time it takes the handle 62 to resume normal position.

Secured to the base plate 2 beneath the rear end of the carriage when the latter is at the inner end of its stroke, is a base 65 from the forward end of which a post 66 rises. Pivotally supported by the upper end of the post is a latch element 67 that is adapted to engage the front side of the collar 50 and retain the carriage at the inner limit of its movement. The latch element is yieldingly retained in effective position by a spring 68 that has one of its ends anchored to the post 66 and its other end attached to a forward extension of the latch element. Mounted on the base 65 is a solenoid 70 whose core 71 is connected to the latch element 66. A standard 73 rises from the base 65 and supports a push button switch 74 in a position to be actuated by the rear cross member 29 of the carriage. Said member engages the button of the switch and forces it inwardly to close the circuit, as indicated in Fig. 9, when the carriage is in its rear position.

As appears from the diagram of Fig. 9, electric current is led from a suitable source, represented as a battery 77, through a wire 78, the contact members of the switch 74, wire 79, winding of the solenoid 70 and wire 80, to one of the contact members of the make-and-break device 81 of the time switch 61, the other member of said device being connected to the source by wire 82. It is clear from this that when the carriage is in its rear position so as to maintain the switch 74 closed, a closing of the circuit at the time switch 61 will result in energization of the solenoid 70 and a withdrawal of the latch element 67 from the collar 50 thereby to release the carriage. The instant the carriage starts to move forwardly the circuit will be broken at 74 so as to prevent prolonged energization of the solenoid. There is a further purpose in this arrangement that will be brought out in the description of the operation of the machine.

A cam 85 extends from the rear end of the carriage 27 in the path of the operating member 20 of the control valve 16 and when the carriage approaches its rear position said cam will engage said member and swing it, against the action of the spring 22, from the position shown in Fig. 5 to that shown in Fig. 1 thereby to open the valve and deliver gas to the burners.

Hinged at 86 to the front side of the partition 6, above the opposite ends of the slot 41 are toast receptacles designated generally by the reference numeral 87. Each includes a curved wall 88 and two laterally spaced wire retainers 89. The toast receptacles hang normally adjacent the bottom of the cooking compartment where they are adapted to support a piece of bread, as a half bun, in operative position to toasting arms 90 of the lower burner 11. The receptacles are adapted to be loaded and unloaded through openings 91 in the top 3 of the casing above the ends of the cooking compartment 7, and when the carriage moves forwardly it engages and lifts the toast receptacles to the position shown in Figs. 5, 6 and 7. Guards 92 extend downwardly and inwardly from the front wall 5 in operative relation to the free ends of the toast receptacles.

*Operation*

Equipped with an automatic control, as of the character above described, the machine, when idle, stands in the condition shown in Fig. 5, with the grill projected from the cooking compartment. To originally condition the machine for use, the valve 17 is opened and the pilot light is ignited. When the operator desires to prepare a sandwich, he grasps the handle 39 and pulls the grill cup, with the carriage, forward to the position shown in Fig. 6, which movement causes the cover 55 to be raised due to its connection with the rod 58, the latter being held against forward movement by the engagement of the abutment 59 with the frame member 42. The operator next places the required quantity of ground meat to produce a cake in the grill cup 35 and then, by means of the handle 39, shoves the grill cup, with the carriage, inward to dispose the former in cooking position, the cover 55 having closed during such operation. Holding the carriage inward against the action of the spring 60, he sets the time switch to the position representing the period of cooking desired, depending upon whether the meat is to be cooked rare, medium or well done. Forcing the carriage to its rear position closes the switch 74, and the carriage is held in such position by engagement of the latch element 67 with the collar 50, as shown in Fig. 1. Setting of the time switch opened the solenoid circuit, and it remains open until the time switch resumes normal condition and closes the make-and-break device 81. As the carriage 27 arrives at its rear position the cam 85 engages the operating member 20 of the control valve 16, swinging said member against the action of the spring 22 in a direction to open the valve and deliver gas to the burners which is ignited by the pilot light. The operator also drops the halves of a bun, or slices of bread, through the openings 91 (Fig. 3) into the toast receptacles 87 and while the meat is being cooked between the burners 10 and 11, the bread is being toasted by the flames from the toasting arms 90 of the lower burner 11.

The cooking operation proceeds without further attention until the time switch closes the solenoid circuit, thus effecting energization of the solenoid 70, causing it to withdraw the latch element 67 from engagement with the collar 50, releasing the carriage 27. The spring 60, acting against the abutment 59, will force the carriage forwardly through the intervention of the rod 58 and cover 55 until the abutment 59 engages the frame member 42. This will stop the carriage in the position shown in Fig. 5 with the grill cup projected from the cooking chamber 7 but with its cover 55 in closed position. At the same time, the toast receptacles 87 will be lifted and retained in elevated position by the carriage, as best shown in Fig. 7. When the cam 85 withdraws from the operating member 20, the spring 22 will move said member in a direction to close the valve 16 and shut off the supply of gas to the burners. The parts may remain in this position until the operator is ready to assemble and serve the sandwich. At such time he grasps the handle 39 and pulls the carriage forwardly to the limit of its movement which will cause the cover of the grill cup to be elevated to the position shown in Fig. 6. The operator then takes a piece of toast, or toasted half bun, from one of the receptacles 87 and places it on top of the grill cup and holding it there inverts the cup by means of the handle 39, using it in the manner of a crank. When the cup is inverted it discharges the meat cake onto the toast and the operator completes the sandwich by removing the other piece of toast from the machine and applying it to the other side of the meat cake.

As previously explained, the electric circuit through the solenoid 70 is interrupted as soon as the carriage leaves the push button of switch 74 and starts on its forward excursion, the switch being of the self opening type. Because of the arrangement described, an operator is prevented from loading the machine and leaving it in cooking condition without first adjusting the time switch. This is due to the fact that, with the time switch in "off" position and the make-and-break device closed, the circuit through the solenoid winding would be established the instant the carriage assumes its rear position and with the solenoid energized the latch element 67 would be retained in ineffective position.

By reason of the design of my machine, and its compactness, two or more may be arranged side by side and practically against one another and all may be connected to a common gas supply pipe or manifold, and to a common source of electrical energy if an electromagnetic time latch is employed. In a multiple installation it is desirable to provide a shut-off valve 17 for each unit. With a battery of several machines, depending upon the maximum demand, an establishment may utilize as many machines as necessary to supply its immediate needs. It is only a matter of opening a valve and lighting the pilot burner to place an additional machine or unit in operative condition.

While I have specifically described one embodiment of the invention, it is to be understood that I do not limit myself to such an embodiment further than is required by the terms of the appended claims.

Having thus described my invention, what I claim is:

1. In a cooking machine, opposed burners spaced one above the other, a grill cup, a cover therefor, means supporting the grill cup for movement in a substantially horizontal plane to and from a cooking position between said burners, and further means acting automatically to lift the cover when the grill cup is moved from cooking position to a filling and discharging position.

2. In a cooking machine, a combustion device, a cooking utensil, and means supporting the utensil for oscillation and for movement to and from a cooking position in operative relation to the combustion device, the utensil being adapted to be inverted to discharge food therefrom when moved from cooking position.

3. In a cooking machine, a combustion device, a cooking utensil, means supporting the utensil for oscillation and for movement to and from a cooking position in operative relation to the combustion device, the utensil being adapted to be inverted to discharge food therefrom when moved from cooking position, and means preventing oscillation of the utensil when in cooking position.

4. In a cooking machine, a horizontally movable element, a grill cup supported thereby for oscillation on a horizontal axis, upper and lower burners between which the grill cup is supported when the element is at one end of its movement, the grill cup being removed from between the burners when the element is at the other end of its movement, means for inverting the grill cup when the element is in the latter position, and means holding the grill cup horizontal when the element is in the former position.

5. In a cooking machine, a horizontally movable element, a shaft rotatably supported thereby, a grill cup carried by said shaft, upper and lower burners between which the grill cup is supported when the element is at one end of its movement, the grill cup being removed from between the burners when the element is at the other end of its movement, means for rotating the grill cup on the axis of said shaft when the element is in the latter position, and means holding the grill cup horizontal when the element is in the former position.

6. In a cooking machine, combustion means, a grill, means supporting the grill for movement to and from a cooking position in operative relation to the combustion means, a toast receptacle movably supported independently of the grill, and mechanism through which the toast receptacle is caused to be moved to and from a toasting position in operative relation to the combustion means when the grill is moved to and from cooking position.

7. In a cooking machine, combustion means, a grill cup, means supporting the grill cup for movement to and from a cooking position in operative relation to the combustion means, a movably supported toast receptacle biased toward a position in operative relation to the said combustion means, and operative connections through which the toast receptacle is moved to unloading position when the grill cup supporting means is moved to shift said cup from cooking position.

8. In a cooking machine, a horizontally movable element, a grill cup supported thereby for oscillation on a horizontal axis, upper and lower combustion means between which the grill cup is supported when said element is at one end of its movement, a toast receptacle movably supported and shiftable between a position adjacent the combustion means and a second position, said receptacle being so shifted automatically when the aforesaid element is moved to shift the grill cup from a cooking position between the combustion means to a discharging position, and means for inverting the grill cup when in the latter position.

9. In a cooking machine, a horizontally movable element, a grill cup supported thereby for oscillation on a horizontal axis, upper and lower combustion means between which the grill cup is supported when said element is at one end of its movement, means for retaining the grill cup horizontal when between said combustion means, a toast receptacle movably supported adjacent the combustion means and biased toward a position in operative relation thereto, the receptacle being shifted from said position to a second position when the aforesaid element is moved to shift the grill cup from a cooking position between the combustion means to a discharging position, and means for inverting the grill cup when in the latter position.

10. In a cooking machine, a horizontally movable element, a grill supported thereby for oscillation upon a horizontal axis, combustion means adjacent which said grill is sustained in a horizontal cooking position when said element is at one end of its movement, latch means for retaining said element at such end of its movement, means acting to move said element toward the other end of its movement when said latch means is actuated thereby to shift the grill from cooking position toward a discharging position, means for inverting the grill when in the latter position, and a timing device for actuating the latch.

11. In a cooking machine, a carriage reciprocable in a substantially horizontal plane, a grill supported thereby, combustion means in operative relation to which the grill is sustained when the carriage is at one end of its stroke, a latch for holding it in the latter position, means acting to shift the carriage toward the other end of its stroke when said latch is released thereby to move the grill beyond the influence of the combustion means, electromagnetic means for releasing the latch, a time switch, and an electric circuit including said switch and the electromagnetic means.

12. In a cooking machine, a carriage reciprocable in a substantially horizontal plane, a grill supported thereby, combustion means in operative relation to which the grill is sustained when the carriage is at one end of its stroke, a latch for holding it in the latter position, means acting to shift the carriage toward the other end of its stroke when said latch is released thereby to move the grill beyond the influence of the combustion means, electromagnetic means for releasing the latch, a time switch, an electric circuit including said switch and the electromagnetic means, and a switch in said circuit that is closed when the carriage is in latched position and is open when the carriage is moved from said position.

13. In a cooking machine, the combination of a horizontally reciprocable carriage, a grill cup supported thereby, a cover for the grill cup, an element reciprocable in a course substantially parallel to that of the carriage and limited to less than the movement of the latter in one direction, connections between said element and the cover whereby the cover is moved to open position during movement of the carriage in excess of that of said element in the aforesaid direction, and combustion means in operative relation to which the grill cup is disposed when the carriage is at the limit of its movement in the opposite direction.

14. In a cooking machine, the combination of a horizontally reciprocable carriage, a grill cup supported thereby, a cover for the grill cup, an element reciprocable with the carriage in a course substantially parallel to that of the carriage and limited to less than the movement of the latter in one direction, connections between said element and the cover whereby the cover is moved to open position during movement of the carriage in excess of that of said element in the aforesaid direction, a gas burner in operative relation to which the grill cup is disposed when the carriage is at the limit of its movement in the opposite direction, means controlling the supply of gas to the burner, and mechanism operated by a part reciprocable with the carriage for increasing the gas supply when the carriage is moved in the second mentioned direction and for reducing the gas supply when the carriage is moved with said element in the first mentioned direction.

15. In a cooking machine, the combination of a horizontally reciprocable carriage, a grill cup supported thereby, a cover for the grill cup, an element reciprocable in a course substantially parallel to that of the carriage and limited to less than the movement of the latter in one direction, connections between said element and the cover whereby the cover is moved to open position during movement of the carriage in excess of that of the element in the aforesaid direction, a combustion device in operative relation to which the grill cup is disposed when the carriage is at the limit of its movement in the opposite direction, a spring acting through the intervention of the aforesaid element for moving the carriage in the first mentioned direction, and a latch for retaining the carriage at the limit of its movement in the second mentioned direction.

16. In a cooking machine, the combination of a horizontally reciprocable carriage, a grill cup supported thereby, a cover for the grill cup, an element reciprocable in a course substantially parallel to that of the carriage and limited to less than the movement of the latter in one direction, connections between said element and the cover whereby the cover is moved to open position during movement of the carriage in excess of that of the element in the aforesaid direction, a combustion device in operative relation to which the grill cup is disposed when the carriage is at the limit of its movement in the opposite direction, a spring acting through the intervention of the aforesaid element for moving the carriage in the first mentioned direction, a latch for retaining the carriage at the limit of its movement in the second mentioned direction, and a timing device for effecting release of the latch.

17. A cooking machine comprising a frame in the front of which are walls enclosing a cooking compartment including a front wall having an opening and a rear wall having a horizontal slot, a carriage supported by the frame for horizontal movement in the plane of said slot, a shaft rotatably supported by the carriage substantially on the central longitudinal axis thereof, a grill cup carried by the forward end of the shaft, a closure for the opening in the front wall of the cooking compartment connected to the grill cup, a handle projecting forwardly from the said closure, gas burners in the cooking compartment between which the grill cup is adapted to be supported in a substantially horizontal position, parts on the aforesaid shaft and on the frame of the machine that cooperate to prevent rotation of the shaft except when the carriage is adjacent the forward end of its movement, a cover for the grill cup hinged to the carriage, means connected to the cover and arranged for cooperation with a part on the frame whereby the cover is lifted when the carriage is at the extreme forward limit of its movement with the grill cup projected forwardly of the front wall.

18. A cooking machine comprising a frame in the front of which are walls enclosing a cooking compartment including a front wall having an opening and a rear wall having a horizontal slot, a carriage supported by the frame for horizontal movement in the plane of said slot, a shaft rotatably supported by the carriage substantially on the central longitudinal axis thereof, a grill cup carried by the forward end of the shaft, a closure for the opening in the front wall of the cooking compartment rigidly connected to the grill cup, a handle projecting forwardly from the said closure in eccentric relation to the aforesaid shaft, gas burners in the cooking compartment between which the grill cup is adapted to be supported in a substantially horizontal position, parts on the aforesaid shaft and on the frame of the machine that cooperate to prevent rotation of the shaft except when the carriage is adjacent the forward end of its movement, a cover for the grill cup hinged to the carriage, means connected to the cover and arranged for cooperation with a part on the frame whereby the cover is lifted when the carriage is at the extreme forward limit of its movement with the grill cup projected forwardly of the front wall.

19. A cooking machine comprising a frame in the forward end of which are walls enclosing a cooking compartment including a front wall having an opening and a rear wall having a horizontal slot, a carriage supported by the frame for horizontal movement in the plane of said slot, a shaft rotatably supported by the carriage substantially on the central longitudinal axis thereof, a grill cup carried by the forward end of the shaft, a closure for the opening in the front wall of the cooking compartment connected to the grill cup, a handle projecting forwardly from said closure, gas burners in the cooking compartment between which the grill cup is adapted to be supported in a substantially horizontal position, parts on the aforesaid shaft and on the frame of the machine that cooperate to prevent rotation of the shaft except when the carriage is adjacent the forward end of its movement, a cover for the grill cup hinged to the carriage, means connected to the cover and arranged for cooperation with a part of the frame whereby the cover is lifted when the carriage is at the extreme forward limit of its movement, toast receptacles hingedly supported within the cooking compartment in operative relation to the burners, the carriage cooperating with said receptacles to lift them when the carriage moves forwardly, the top wall of the cooking compartment having openings affording access to the toast receptacles.

20. In a cooking machine, a combustion device, a grill cup, means supporting the grill cup for oscillation on a horizontal axis and for movement to and from a cooking position in operative relation to the combustion device, the grill cup being adapted to be inverted to discharge food therefrom when moved from cooking position, and a cover for the grill cup hingedly supported in operative relation to the cup for swinging movement on a horizontal axis at right angles to the axis of oscillation of the cup.

ROBERT W. STIRGWOLT.